United States Patent [19]

Fischer et al.

[11] Patent Number: 5,106,250
[45] Date of Patent: Apr. 21, 1992

[54] CONNECTING ELEMENT FOR A FACING PANEL

[75] Inventors: Artur Fischer, Waldachtal; Willi Haug, Freudenstadt; Stefan Lind, Birkenhördt, all of Fed. Rep. of Germany

[73] Assignee: Artur Fischer GmbH & Co KG fircherwerke, Waldachtal, Fed. Rep. of Germany

[21] Appl. No.: 635,471

[22] Filed: Dec. 28, 1990

[30] Foreign Application Priority Data

Jan. 30, 1990 [DE] Fed. Rep. of Germany ....... 4002687
Apr. 6, 1990 [DE] Fed. Rep. of Germany ....... 4011229
Sep. 26, 1990 [DE] Fed. Rep. of Germany ....... 4030498

[51] Int. Cl.5 .............................................. F16B 39/00
[52] U.S. Cl. ...................................... 411/107; 411/24; 411/75; 411/111
[58] Field of Search ............... 411/969, 107, 113, 103, 411/24, 25, 75, 111, 124, 360, 112, 511, 516, 517, 531, 44, 54, 57, 353, 354

[56] References Cited

U.S. PATENT DOCUMENTS

| 1,474,154 | 11/1923 | Kohler et al. | |
| 2,379,349 | 6/1945 | Grinde et al. | 403/276 |
| 2,527,128 | 10/1950 | Green | 411/34 |
| 3,364,808 | 1/1968 | Fischer | 411/60 X |
| 3,476,164 | 11/1969 | Voullaire | 411/181 |
| 4,138,779 | 2/1979 | Weber | 411/107 X |

FOREIGN PATENT DOCUMENTS

| 418921 | 9/1925 | Fed. Rep. of Germany . | |
| 538132 | 4/1929 | Fed. Rep. of Germany . | |
| 1832256 | 5/1961 | Fed. Rep. of Germany . | |
| 2214798 | 8/1974 | France . | |
| 7612133 | 8/1976 | German Democratic Rep. . | |
| 653208 | 2/1963 | Italy | 411/113 |
| 650767 | 6/1963 | Italy | 411/113 |
| 400679 | 4/1966 | Switzerland . | |
| 445203 | 2/1968 | Switzerland | 411/113 |
| 464298 | 4/1937 | United Kingdom | 411/150 |
| 642770 | 9/1950 | United Kingdom . | |

*Primary Examiner*—Rodney M. Lindsey
*Attorney, Agent, or Firm*—Michael J. Striker

[57] ABSTRACT

A connecting element for a facing panel with a hole having a small depth and an undercut, includes an expanding cone insertable into the hole undercut, and thread shaft extending from the expanding cone. A roof-shaped bent expansible element is displaceable over the expanding cone for securing the connecting element in the facing panel hole. The roof-shaped bent expansible element is formed as at least approximately oval metal ring having opposite bent portions abutting the expanding cone.

5 Claims, 2 Drawing Sheets

CONNECTING ELEMENT FOR A FACING PANEL

BACKGROUND OF THE INVENTION

The invention relates to a connecting element for a facing panel with a hole having a small depth and an undercut which connecting element comprises an expanding cone receivable in an area of the undercut, a thread shaft extending from the expanding cone, and an expansible member supported on the expanding cone. The invention also relates to a facing panel with such a connecting element.

Connecting elements form-lockingly securable in an undercut of a facing panel hole are known. Such connecting elements comprise an expansible sleeve that is displaceable over the expanding cone and form-lockingly engages the undercut. However, such connecting elements are not suitable when the depth of the hole is small.

For securing facing panels having a small thickness, the holes with an undercut are formed on the rear side of such facing panels. In these facing panels, the hole depth is very small, and conventional connecting elements, as it has already been stated above, are not suitable for these facing panels.

SUMMARY OF THE INVENTION

The object of the invention is a connecting element adapted to be used with a facing panel having a hole with a small depth, which element can also be easily manufactured and installed. Simplicity of manufacture and installation is very important as, generally, a plurality of such connecting elements are used with a single facing panel.

The object of the invention is achieved by providing a connecting element that includes a roof-shaped bent expansible element displaceable over the expanding cone for securing the connecting element in the facing panel hole, which roof-shaped bent expansible element is formed as at least approximately oval metal ring having opposite bent portions abutting the expanding cone.

For mounting of the connecting element, it is inserted into a hole with the end surface of the expanding cone abutting the hole bottom. Then, the roof-shaped bent expansible element is displaced over the expanding cone with a tubular tool. The outer edges of the ring at that engage the wall surface of the undercut of the panel hole and thereby form-lockingly secure the connecting element in the hole. The connecting element includes essentially a steel threaded bolt having at an end thereof remote from the thread portion, an expanding cone. The roof-shaped bent expansible element represents in the unbent condition a steel somewhat oval ring. In the bent region, the ring is narrowed, that is the ring has in this region two opposite narrow portions. These narrow portions or sides not only facilitate roof-forming bending but also serve as compression zones upon being preloaded in the hole. Thereby the ring is optimally preloaded in the area of the undercut without a need for applying large expanding forces. In the bent region, the ring may be provided with two opposite creases that also facilitate bending and insure an optimal pre-load of the ring in the panel hole.

An assembly that comprises a facing panel with a hole having a small depth and an undercut, and a connecting member securable in the hole and comprising an expanding cone insertable into the hole undercut, a thread shaft extending from the expanding zone, and a roof-shaped bent expansible element displaceable over the expanding cone for securing the connecting element in the facing panel hole and formed as at least approximately oval metal ring having opposite bent portions abutting the expanding cone and an outer rim engaging a wall of the hole defining said undercut, can be easily secured to a respective support.

If an additional spacing sleeve mounted on the thread shaft, engageable with the expanding cone or the ring, and slightly projecting above the facing panel, is used, it additionally prevents pulling of the connecting element from the hole when a large rotational torque is applied to a thread nut which is being screwed onto the threaded shaft of the connecting element. The resulting tension forces are absorbed substantially by the spacing sleeve.

The outer diameter of the spacing sleeve corresponds to the hole diameter so that the spacing sleeve centers the connecting element in the hole and absorbs bending forces applied to the connecting element.

Instead of a spacing sleeve, a plastic washer mounted onto the thread shaft, may be used. The plastic washer has surfaces which, upon tying of the nut, engage the expanding element and the outer surface of the facing panel. The centering sleeve portion of the plastic washer extending into the hole engages the upper portion of the roof-shaped bent ring so that plastic and resilient deformation of the centering sleeve portion insures uniform distribution of pressure applied to the ring and vibration-free pre-loading. Simultaneously, the sealing edges of the plastic washer engage the outer surface of the facing panel, insure an optimal sealing of the hole. The plastic washer also provides additional resilient support for the connecting element.

To increase the resilience and the upsetting ability of the plastic washer to provide for compensation of tolerances of the bore depth and of the height of the expanding element, the end surface of the plastic washer which is located opposite to the centering sleeve portion, is provided with a recess. Therefore, upon screwing of the nut, this end surface can be deformed until the nut engages the major part of this surface.

The present invention both as to its construction so to its method of operation, together with additional objects and advantages thereof, will be best understood from the following detailed description of the preferred embodiment when read with reference to the accompanying drawing.

DESCRIPTION OF THE PREFERRED EMBODIMENT

Figure 1A:
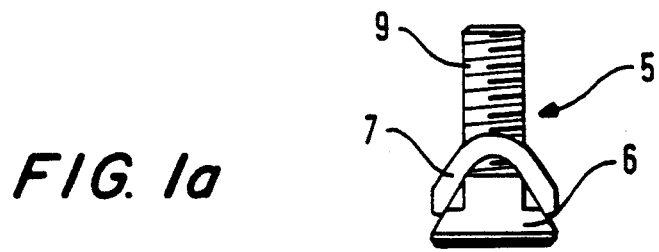
FIG. 1a shows an elevational view of a connecting element with a roof-shaped bent ring according to the present invention.
Figure 1B:
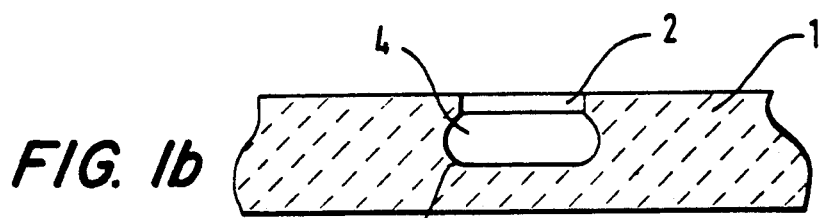
FIG. 1b shows a cross-sectional view of a portion of a facing panel in which the connecting element shown in FIG. 1 is secured.

FIG. 1b shows a facing panel 1 with a hole 2 formed therein and having in the bottom region 3 thereof an undercut 4. This undercut can be formed with conventional reamer means that do not form a part of the subject invention.

The hole 2 is designed for receiving a connecting element 5 having an expanding cone 6. A roof-shaped bent ring 7 is mounted over the expansible cone 6. A thread shaft 9 of the connecting element 5 extends through an opening 8 in the roof-shaped ring 7. The ring 7 is bent to such an extent that it is received together with the connecting element 5 in the hole 2 of the facing panel 1.

Figure 2:
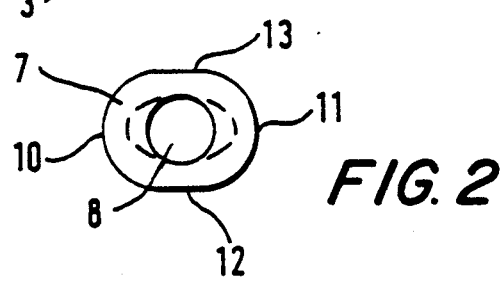
FIG. 2 shows a top view of the ring shown in FIG. 1 in unbent condition.

In the unbent condition, the ring 7 has somewhat an oval shape as shown in FIG. 2. The maximum diameter of the ring 7 in its unbent condition is larger than the diameter of the undercut 4 of the hole 2. The oppositely located round sides 10 and 11 are wider than oppositely located cut sides 12 and 13. The narrow sides 12 and 13 facilitate bending of the ring 7 and serve simultaneously as a compression region upon being pressed into the hole 2 as shown in FIG. 4.

Figure 3:
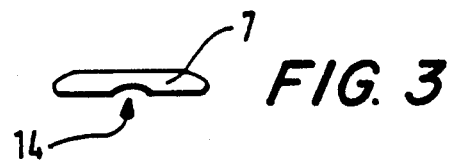
FIG. 3 shows a side view of the unbent ring shown in FIG. 3.

FIG. 3 shows a side view of the ring 7. As can be seen in FIG. 3, the bottom surface of the ring 7 has creases 14 at the narrow sides 12 and 13. These creases facilitate roof-shaped bending of the ring 7 and facilitate compression of the ring material in this region.

Figure 4A:
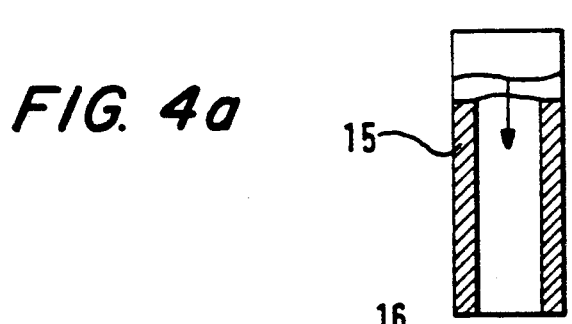
FIG. 4a shows a partially cross-sectional view of a tool for mounting the connecting element in the facing panel.
Figure 4B:
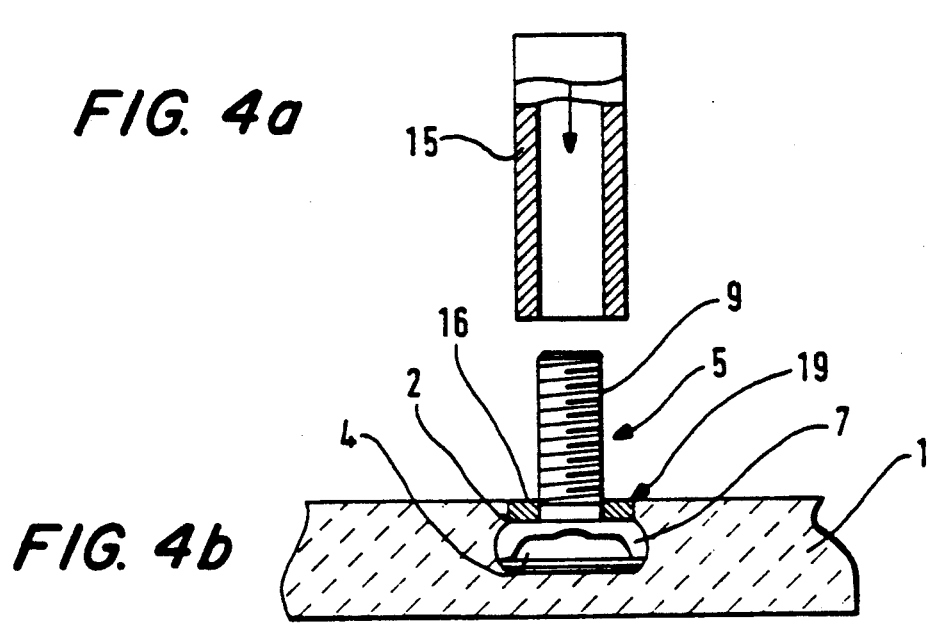
FIG. 4b shows a cross-sectional view of the facing panel with a connecting element secured therein with a spacing ring mounted on the connecting element.

FIGS. 4a and 4b shows a form-locking engagement of the connecting element 5 in the facing panel 1. As shown here, the wider sides 10 and 11 lie against the wall of the hole 2 in the region of the undercut 4. Upon pressing of the ring 7 into the hole 2, not only expansion of the ring in the direction of bent sides 10 and 11 is possible, but also an expansion in the area of sides 12 and 13 is possible. Upon being pressed with the mounting tool 15, the sides 12 and 13 abut the expansible cone 7 and are pressed downward and, therefore, outward.

The mounting tool 15 is a tubular element that is used for pressing the ring 7 before mounting a spacing ring 16 on the connecting element 5. Thereafter, the spacing ring 16 is pushed over the thread stub 9 to be mounted in the hole 2. The spacing ring 16 insures centering and support of the thread stud 9.

Figure 5:
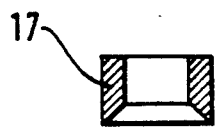
FIG. 5 shows a cross-sectional view of another embodiment of a spacing element.

FIG. 5 shows another embodiment of the spacing element. The spacing element 17 shown in FIG. 5, has an opening that corresponds to the expansible cone 6 and, therefore, can be inserted deeper into the hole 2 so that the end wall engages the upper surface of the ring 7. Both rings 16 and 17 have such dimensions that each of them only slightly projects above the edge 19 of the hole 2.

Figure 6A:
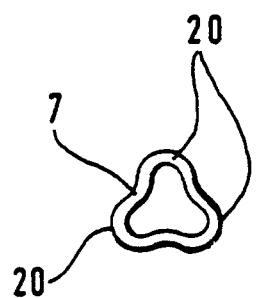
FIGS. 6a and 6b show two other embodiments of an expansible ring.
Figure 6B:
Figure 7:
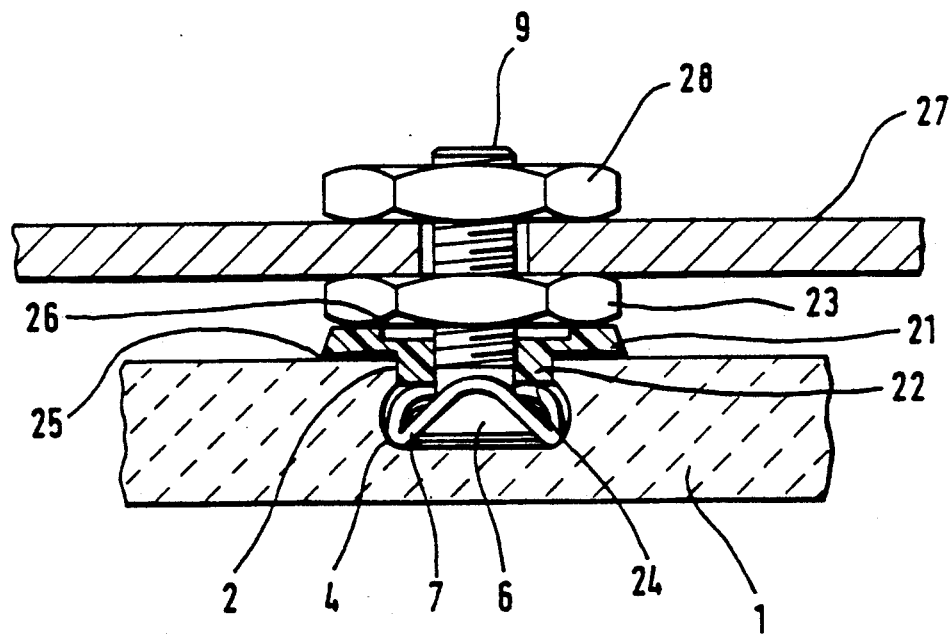
FIG. 7 shows a cross-sectional view of a facing panel with a support secured thereto with a connecting element according to the invention.

Two additional embodiments of the expansible ring are shown in FIGS. 6a and 6b. The expansible ring shown in FIG. 6a has three roof-shaped bent sections. The bent ends 20 of these sections lie in the same plane and have the same radius. They provide three engagement points of the ring 7 with the outer surface of the expanding cone 6. Upon pushing of the expansible ring 7 to secure the connecting element 5 in the hole 2 of the facing panel 1, the three ends 20 are uniformly deflected into undercut 4 of the hole 2. This insures an advantageous distribution of forces and proper centering of the connecting element 5 in the hole 2.

For securing the connecting element 5 in the hole 2 having an undercut 4, the expansible element or ring 7 is pushed over the expanding cone 6 with an impact tool. After securing the connecting element 5 in the hole 2 of the facing panel, a plastic disc member 21 is mounted on the thread shaft 9 of the connecting element 5. The disc member 21 has a centering sleeve 22 projecting into the hole 2 of the facing panel. A nut 23 is screwed over the thread shaft 9 to provide for engagement of the end surface 24 of the centering sleeve 22 with the expansible ring, and of the sealing edge 25 of the plastic disc member 21 with the outer surface of the facing panel 1. Plastic deformation of the disc member 21 provides for a preloading of the expansible element (or ring) 7, so that retaining of the connecting element 5 in the hole is insured. To compensate for tolerances as of the hole 2 length so of the height of the expansible element 7, the plastic disc member has an additional recess 26 so that the disc member is able to flex, if needed, to insure a good preload of the disc member 7. The depth of the recess 26 and the height of the sealing edge 25 are approximately equal to the thickness of the disc member 21 in the area of the recess 26.

The securing of the facing panel 1 on a support 27 of a substructure secured, i.e., to a masonry, is effected with another nut 28.

It is also possible to mount the expansible element 7 on the cone 6 of the connecting element 5 directly with the plastic disc member 21 and the nut 23 which eliminates a need in an impact tool for securing the connecting element 5 in the hole 2 of the facing panel 1.

While the invention has been illustrated and described as embodied in a connecting element for a facing panel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connecting element for a facing panel with a hole having a small depth and an undercut, said connecting element comprising an expanding cone insertable into the hole undercut; a thread shaft extending from said expanding cone; and a roof-shaped bent expansible element displaceable over said expanding cone for securing said connecting element in the facing panel hole, said roof-shaped bent expansible element comprising an at least approximately oval metal ring having opposite bent portions abutting said expanding cone, said ring having side portions defining a bendable region of said ring and of a thickness less than that of the bent portions, said ring in an unbent condition having a larger maximum diameter than the undercut of the facing panel hole in which said connecting element is secured.

2. A connecting element as set forth in claim 1, further comprising a plastic disc member receivable over said thread shaft and having a sealing edge engageable with the facing panel and a centering sleeve extendable into the facing panel hole and movable into engagement with said expansible element.

3. A connecting element as set forth in claim 1, wherein said ring has creases in said bendable region.

4. A connecting element for a facing panel with a hole having a small depth and an undercut, said connecting element comprising an expanding cone insertable into the hole undercut; a thread shaft extending from said expanding cone; a roof-shaped bent expansible element displaceable over said expanding cone for securing said connecting element in the facing panel hole, said roof-shaped bent expansible element comprising at least approximately oval metal ring having opposite bent portions abutting said expanding cone; and a plastic disc member receivable over said thread shaft and having a sealing edge engageable with the facing panel and a centering sleeve extendable into the facing panel hole and movable into engagement with said expansible element, said disc member having on an end side thereof located opposite said centering sleeve a recess.

5. A connecting element as set forth in claim 4, wherein a depth of said recess and a height of said sealing edge are approximately equal to a thickness of said plastic disc member in an area of said recess.

* * * * *